(12) United States Patent
Gatts

(10) Patent No.: US 7,630,330 B2
(45) Date of Patent: Dec. 8, 2009

(54) SYSTEM AND PROCESS USING SIMPLEX AND DUPLEX COMMUNICATION PROTOCOLS

(75) Inventor: Todd D. Gatts, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 10/926,495

(22) Filed: Aug. 26, 2004

(65) Prior Publication Data

US 2006/0056320 A1     Mar. 16, 2006

(51) Int. Cl.
*H04B 7/00* (2006.01)
*H04L 5/16* (2006.01)

(52) U.S. Cl. .................. 370/277; 370/296; 455/90.2

(58) Field of Classification Search .......... 370/296, 370/259, 270, 276–278, 282, 328, 329, 338; 455/73, 90.2
See application file for complete search history.

(56) References Cited

U.S. PATENT DOCUMENTS

| | | | |
|---|---|---|---|
| 4,551,842 A | 11/1985 | Segarra | |
| 4,841,526 A | 6/1989 | Wilson et al. | |
| 5,237,429 A | 8/1993 | Zuiss et al. | |
| 5,406,626 A | 4/1995 | Ryan | |
| 5,491,838 A | 2/1996 | Takahisa et al. | |
| 5,524,051 A | 6/1996 | Ryan | |
| 5,577,266 A | 11/1996 | Takahisa et al. | |
| 5,590,195 A | 12/1996 | Ryan | |
| 5,613,194 A | 3/1997 | Olds et al. | |
| 5,642,397 A | 6/1997 | Agbaje-Anozie | |
| 5,659,596 A | 8/1997 | Dunn | |
| 5,745,532 A | 4/1998 | Campana, Jr. | |
| 5,751,806 A | 5/1998 | Ryan | |
| 5,809,472 A | 9/1998 | Morrison | |
| 5,815,671 A | 9/1998 | Morrison | |
| 5,825,755 A * | 10/1998 | Thompson et al. | .......... 370/296 |
| 5,889,474 A | 3/1999 | LaDue | |
| 5,926,624 A | 7/1999 | Katz et al. | |
| 5,930,350 A * | 7/1999 | Johnson | ................. 379/355.06 |
| 5,974,312 A | 10/1999 | Hayes, Jr. et al. | |
| 5,982,281 A | 11/1999 | Layson, Jr. | |
| 6,192,340 B1 | 2/2001 | Abecassis | |
| 6,285,886 B1 | 9/2001 | Kamel et al. | |

(Continued)

FOREIGN PATENT DOCUMENTS

EP     0772367     5/1997

(Continued)

*Primary Examiner*—Aung S Moe
*Assistant Examiner*—Kerri M Rose
(74) *Attorney, Agent, or Firm*—Greenblum & Bernstein P.L.C.; John R. Pivnichny

(57) ABSTRACT

The invention is directed to a method of and apparatus for initiating a duplex communication in response to a received simplex communication. In one embodiment of a method of converting a simplex communication to a duplex communication a simplex message is received; a duplex communication protocol is transmitted in response; and a duplex communication is initiated based on the response. In another embodiment of a method of converting a simplex communication to a duplex communication, a simplex message from a sender is received that includes the sender's simplex ID. A duplex communication protocol associated with the sender's simplex ID is sought, and a duplex communication based on the duplex communication protocol is initiated when the protocol is received.

24 Claims, 7 Drawing Sheets

U.S. PATENT DOCUMENTS 6,370,931 B2    4/2002  Bennett
6,563,804 B1 *  5/2003  Iyer et al. .................. 370/296
7,230,930 B2 *  6/2007  Ahya et al. ................. 370/278

FOREIGN PATENT DOCUMENTS

EP      0959635         11/1999
JP      8316872 A       11/1996
WO      WO 97/26718     7/1997

* cited by examiner

US 7,630,330 B2

SYSTEM AND PROCESS USING SIMPLEX AND DUPLEX COMMUNICATION PROTOCOLS

BACKGROUND OF THE INVENTION

1. Field of the Invention

The invention generally relates to telephonic and radio communications, and more particularly, to wireless communications using simplex and duplex protocols.

2. Background Description

There are three ways for data communications to flow between electrical or digital devices: simplex, half-duplex and full duplex. In simplex communications, information only flows in one direction, as from a radio station transmitter to a home radio receiver. In true simplex communications, there is thus no return signal. In half-duplex communications, information flows in both directions, but only in one direction at a time. Examples of such half-duplex communications include CB, walkie-talkie, or marine radio communications where one party must complete their transmission before the other party can reply. In full-duplex communications, data is transmitted in both directions simultaneously. A common example is a telephone conversation in which both parties are talking and listening simultaneously. Full-duplex is sometimes used in modern computer and video networks to facilitate real-time exchange of information.

Today, personal communicators (cellphones, two-way radios, handheld computers, etc.) abound, and short voice messages are often transmitted over half-duplex channels because pressing a push-to-talk (PTT) button to instantly connect to another person's communicator is faster than dialing the person's conventional duplex telephone number. However, current personal communications devices are not capable of seamlessly switching from simplex or half-duplex mode to full-duplex mode. Thus, various problems arise when a recipient of a simplex message (e.g., either a true simplex communication or one-part of a two-way half-duplex communication) wishes to transition to full-duplex mode.

For example, if a conventional duplex communication protocol is known, the transition occurs after the protocol is speed-dialed or dialed by hand. Although effective, this method is time consuming. It also requires focus and attention, which may not be available if the user is preoccupied, such as, for example, driving a vehicle or otherwise engaged in another activity. The problem only worsens when the other party's telephone number is not known, in which case the call is either delayed or not placed at all. Thus, a need exists for automatically and seamlessly converting a simplex (or half-duplex) communication into a duplex communication.

SUMMARY OF THE INVENTION

In one embodiment, a method of converting a simplex communication to a duplex communication is disclosed. The method is illustratively described as follows. A simplex message is received, and a duplex communication protocol is transmitted in response. Thereafter, a duplex communication is initiated based on the response.

In another embodiment of a method of converting a simplex communication to a duplex communication, a simplex message from a sender is received that includes the sender's simplex ID. A duplex communication protocol associated with the sender's simplex ID is sought, and a duplex communication based on the duplex communication protocol is initiated when the protocol is received.

Another embodiment of the invention provides a computer program product. The computer program product includes a computer usable medium having computer-readable program code embodied in the medium. Additionally, the computer program product includes at least one component to receive a simplex message from a sender that includes the sender's simplex ID; at least one component to seek the sender's duplex communication protocol by querying a database having stored therein a plurality of matched pairs of simplex IDs and associated duplex communication protocols; at least one component to compare the sender's simplex ID with the plurality of stored simplex IDs until a match occurs; and at least one component to initiate a duplex communication based on the match.

Another embodiment of the invention is directed to a communicator for converting a simplex communication into a duplex communication. Illustratively, the communicator includes a simplex transceiver and a duplex transceiver both coupled to a central processing unit (CPU). Also included in the communicator is a memory for storing computer-readable instructions. When executed, the computer-readable instructions to cause a processor to receive a simplex message; transmit a duplex communication protocol in response to the simplex message; and initiate a duplex communication based on the response.

In another embodiment of the invention, a recipient receives a simplex message from a sender, and the message includes the sender's simplex ID. In response, the recipient transmits a coded simplex message to the sender that includes the recipient's duplex communication protocol as well as a set of computer readable instructions. When received by the sender's computer processor, the instructions cause a duplex communication to be initiated that is addressed to the recipient's duplex communication protocol.

DETAILED DESCRIPTION OF THE INVENTION

The invention is directed to using personal communicator simplex addresses (hereinafter, "simplex IDs") to automatically convert a simplex communication into a duplex communication upon receipt and execution of a user-initiated voice or tactile command. This allows for the initiation of a duplex communication upon receipt of the simplex protocol without interruption of communications initiated initially using simplex protocols. For example, a duplex call may be automatically initiated to the sender of a simplex message upon receipt of a duplex protocol and an "initiate command". Alternatively, the duplex call may be initiated as soon as the user touches a portion of a touch screen, or presses an alphanumeric or other key, incorporated in their personal communicator. The personal communicator may be a cell phone or personal data assistant. Alternatively, the personal communicator may be any digital or electrical communications device having simplex and duplex capabilities.

Figure 1:
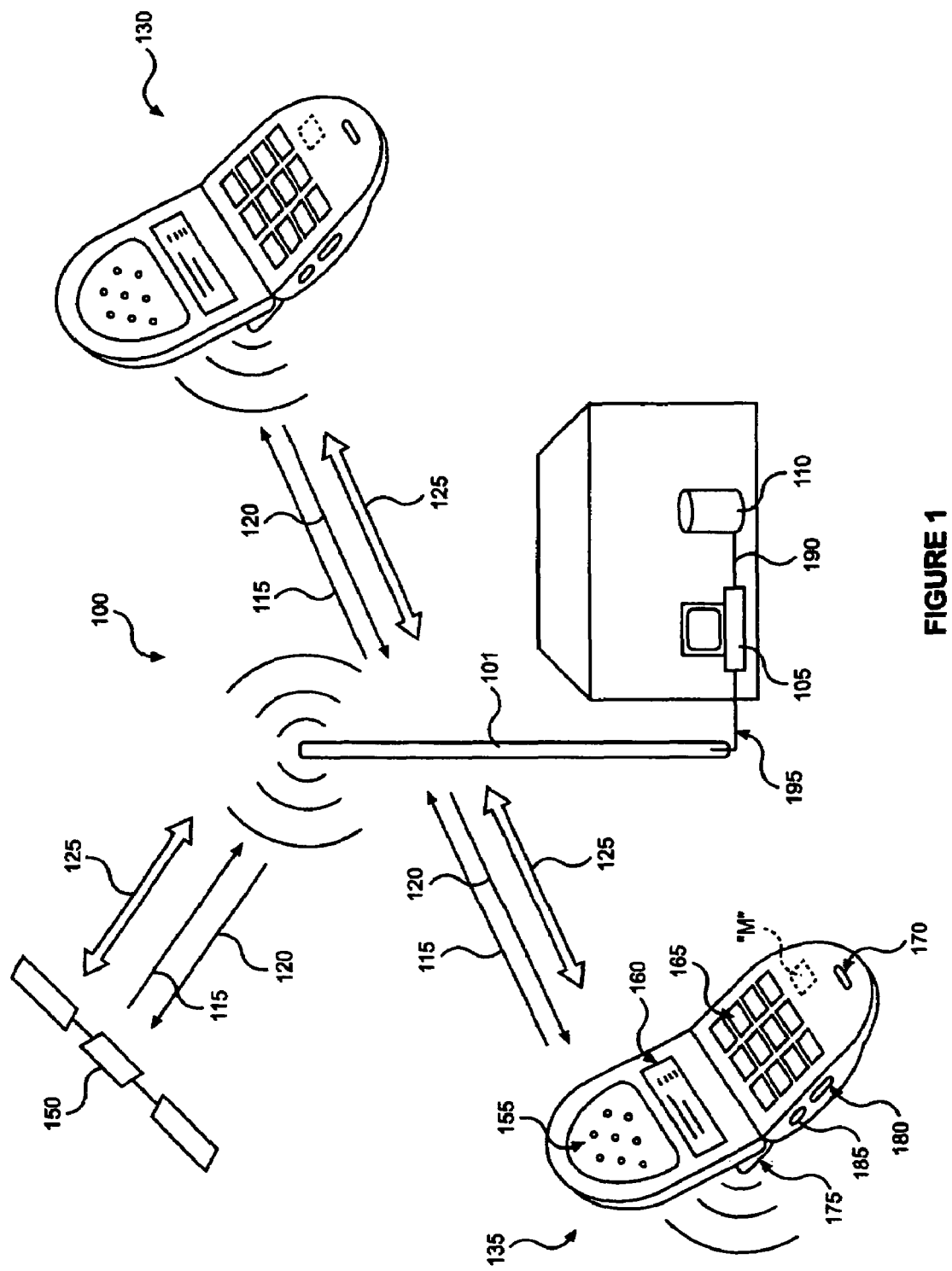
FIG. 1 is a diagram illustrating components and operation of an exemplary network in which embodiments of the invention operate.

FIG. 1 is a diagram illustrating components and operation of an exemplary network 100 in accordance with an embodiment of the invention. Illustratively, the network 100 is a wireless network that includes at least one transmission/receiving point 101, such as, for example, a transceiver antenna for communicating between personal communicators 130 and 135. At least one computer server 105 and least one database 110 accessible by the computer server 105 are in communication with the transceiver antenna via a data connection 195. The server 105 and database 110 are in data communication via the data connection 190. Simplex channels 115 and 120 and duplex channel 125 are used to communicate data between communicators 130 and 135. Additionally, the network 100 may include one or more communication satellites 150 in communication with the transmission/receiving point(s) 101.

The personal communicators (hereinafter "communicator" or "communicators") 130 and 135 may include components, such as, but not limited to, a speaker 155, a viewable display 160, an input device 165 (such as an alphanumeric keypad, touch screen, or stylus track pad), a microphone 170, an antenna 175, a push-to-talk (PTT) button 180 for simplex communications, and a command interface 185 (e.g., a duplex connection button or a touch-sensitive area).

Although not shown, it is understood that communicators 130 and 135 may be, or include, computers. For example, each of communicators 130 and 135 may have a central processing unit (CPU) (e.g., computer processor chip) connected via a data bus to at least (i) a memory "M", (ii) a transceiver, (iii) an output device (such as speaker 155 and display 160) and (iv) one or more input devices (such as keypad 165, microphone 170, a PTT button 180 for simplex communications, and a command interface 185 for initiating duplex communications). Additionally, the processor may be connected via a power bus to a power source (not shown). Illustratively, the power source may be an external power source such as an electrical outlet or an internal power source such as a battery. In one embodiment, the command interface 185 includes a microphone 170 coupled to the CPU and configured to receive voice input. In such an embodiment, the command interface 185 may include computer readable instructions stored in the communicator's memory "M" that, when executed by the CPU, cause the received voice input to be recognized as a command to initiate a duplex communication.

Figure 6:
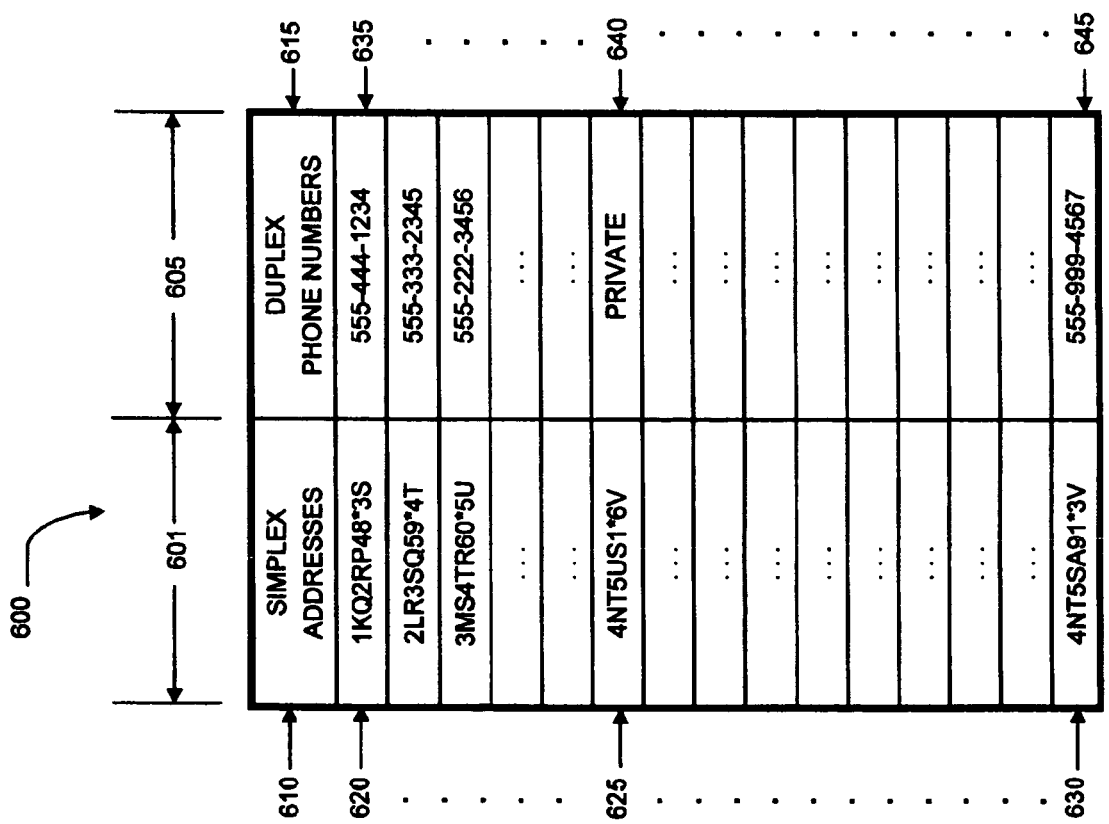
FIG. 6 is a diagram illustrating an illustrative database that may be implemented in embodiments of the invention.

The memory "M" stores data input by a user, another communicator, or another network device. In one embodiment, the data includes computer-readable commands that are executable by the CPU (hereinafter "processor"), which accesses, retrieves and processes data stored in the memory "M". Illustratively, the memory "M" may be flash memory, random access memory (RAM), Dynamic Random Access Memory (DRAM), embedded DRAM, disk drive, or other type of memory suitable for use in a computer. The data stored in memory may include one or more computer executable software programs that permit components of each of the communicators 130 and 135 to create, send, receive, read, store and process messages over duplex channel 125 and/or simplex channels 115 and 120. The memory "M" may also include one or more databases, in which one or more tables of information are stored. The table may illustratively include a list of matched pairs of simplex IDs and associated duplex communication protocols. An example of one such table is shown in FIG. 6.

The transceiver (not shown) of each communicator 130 and 135 outputs signals to, and receives signals from, transmission point 101 and/or satellite 150 via the antenna 175. The transceiver is configured to transmit and receive coded or non-coded simplex messages over the simplex channels 115 and 120, as well as transmit and receive conventional or modified duplex messages over the duplex channel 125.

Speaker 155 outputs sounds, such as speech, music, background noise, etc. to the ear of a user of the communicator, whereas display 160 outputs visual and graphical data to the user, such as, but not limited to, text messages, digital photos, duplex telephone numbers, simplex IDs, date, time, names of personal contacts, calendar information, to name a few functions. Microphone 170 converts external sound waves into electrical signals that are routed first to the processor for processing and then to the transceiver for transmission or to the memory for storage. Microphone 170 may be used to capture a voice command, which is relayed, via the appropriate electrical and/or digital circuitry to the processor for execution. Illustratively, one such voice command may be, but is not limited to, the spoken phrase "Duplex", or its equivalent. Such a command, when received and processed, causes components of the communicator to automatically locate, retrieve and dial the duplex communication protocol (in one embodiment, the duplex phone number) of the sender of a simplex message that was received prior to reception of the command, as discussed in more detail below. Alternatively, a similar command, which achieves the same result, may be initiated by pressing a button 185 or otherwise inputting the command into computer-readable form.

Server 105 includes similar computer components and features as those described above with reference to communicators 130 and 135. Database 110 may reside at a remote server or be stored in the memory of server 105. Either way, the database 110 is linked to the processor of server 105 via a connection, e.g., data bus 190. Like communications link 195, data bus 190 may be a wire, a cable, or a wireless transceiver device. If database 110 is stored on a remote server, the data bus 190 may include the Internet path or network path that links server 105 with the database 110.

Communications link 195 connects the server 105 with the transceiver point 101 so that simplex and duplex messages addressed to the network can be routed to the server 105 for processing. Database 110 may include one or more tables, such as the table illustratively shown in FIG. 6. Server 105 may include a comparator embodied in either software or hardware that compares a simplex ID received from communicator 135 with the list of simplex IDs stored in the database 110. If a match is found, server 105 either returns the matching duplex communication protocol to the communicator 135 or automatically connects the communicator 135 to the communicator 130 associated with the duplex communication protocol via the duplex channel 125 in accordance with the invention as discussed in greater detail below.

Although not shown, it is understood that server 105 includes a memory connected to a processor via a data bus. The memory of server 105 stores data inputted by server administrators and various network devices. The data stored in the server's memory may include one or more computer executable software programs that permit components of each communicator 130 and 135 to create, send, receive, read, store and process messages over duplex channel 125 and/or simplex channels 115 and 120. As further described below, one such software program may modify the network 100 to permit placement of a modified duplex call (e.g., a duplex call addressed to the simplex ID). The processor of server 105 may be connected to the various output devices, input devices and power devices (such as visual displays, keyboards, cursor device, microphone, etc.) previously mentioned.

In use, a sender of communicator 130 transmits a simplex message to a user of communicator 135 over simplex channel 120. The simplex message is addressed to an alphanumeric identifier uniquely associated with communicator 135 and transmitted over simplex channel 120. Thus, although broadcast to virtually every device within network 100, the simplex message will be accepted and answered only by communicator 135. In some cases, however, the simplex message will be answered by the network server 105, which monitors the flow of messages through the network 100. For example, if communicator 135 is turned off or is out of range, the network server 105 may return a "not available" message in response to the simplex message sent by the communicator 130.

The simplex message is comprised, in one embodiment, of signal packets. Each packet includes a header and a body. Data contained in the header indicates to communicator 135 what type of message is being received, e.g., a text message, a picture message, a voice message or a request message. Additionally, either the header or the body may include the simplex address of communicator 130 so that communicator 135 can respond with a simplex message of its own via simplex channel 115. For example, data contained in the body of the message may be the substance of the message itself, such as, for example, picture, text, or voice data. The packets may be encoded using conventional encoding and transmission protocols. After leaving communicator 130, the simplex message travels to the nearest transceiver point 101, which relays the message to communicator 135 via the most direct path. Illustratively, such a path may include network server 105, other transceiver points, and satellite 150.

Communicator 135 receives the simplex message. It also decodes, stores and indicates it to its user. To send a reply message over simplex channel 115, the user audibly or tactilely issues a command to the communicator 135, such as, for example, depressing button 185. This signals the communicator's processor to create and transmit a simplex message in reply. The sender's simplex ID is retrieved from the original message and inserted into the header of each packet, along with the recipient's simplex ID. The body of each packet may be empty (e.g., the request for the sender's duplex communication protocol is inserted within the packet header) or may contain the request for the sender's duplex communication protocol. In another embodiment, information inserted within the header includes the recipient's duplex communication protocol, and information inserted within the body includes machine-executable code that causes the sender's communicator to automatically dial the duplex communication protocol contained in the header.

The invention is now described more fully with reference to four illustrative scenarios. Each scenario begins with a first cell phone user, "Alice," sending a simplex message to a second cell phone user, "Bob." The scenario ends with Bob placing a duplex call to Alice. In the scenarios, Alice's communicator is represented by block 130, Bob's communicator by block 135, and the network, itself, by block 100.

Figure 2:
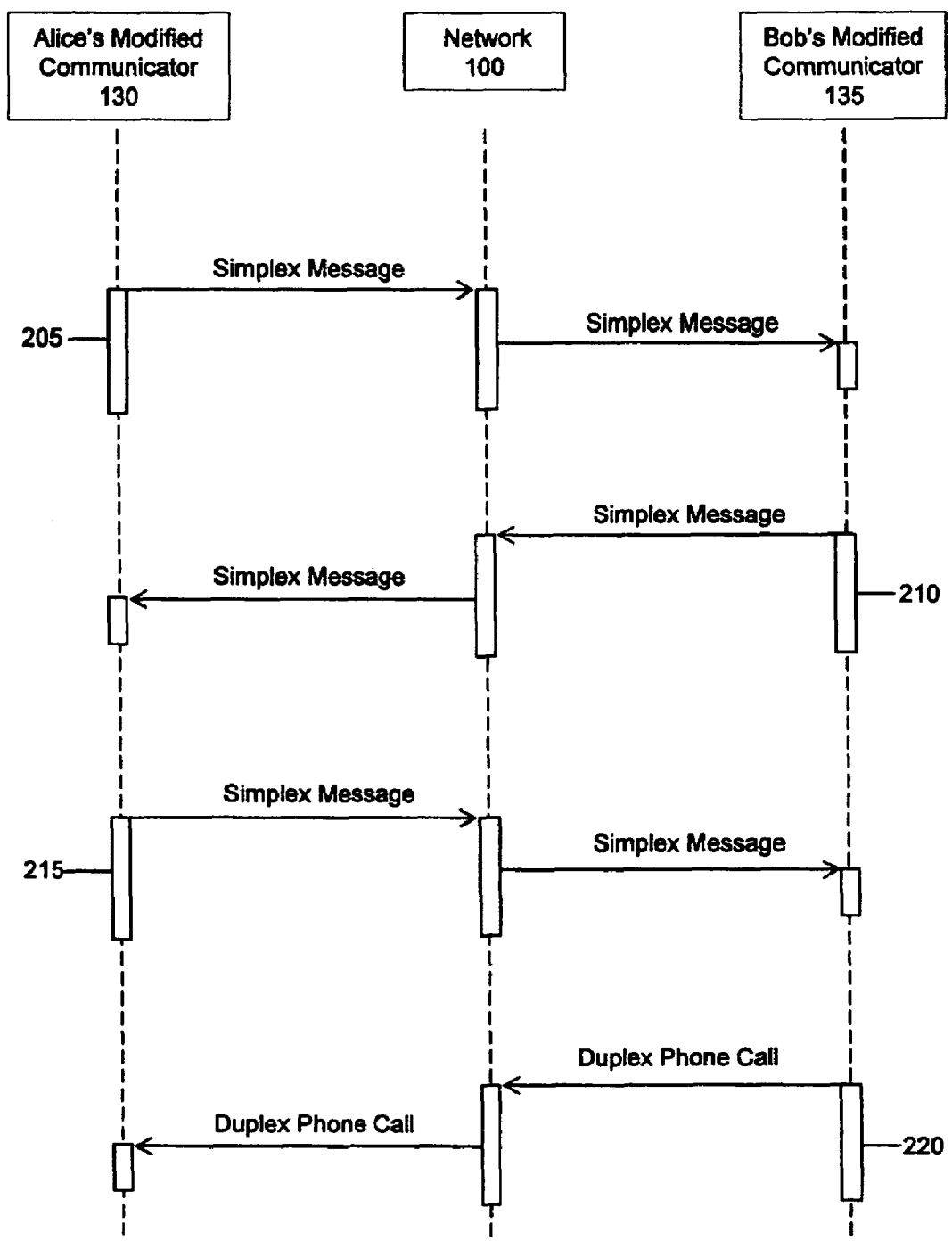
FIG. 2 is a diagram illustrating a simplex communication converted to a duplex communication.

Referring now to FIG. 2, there is shown a diagram that illustrates a method used in an embodiment of the invention to convert a simplex communication into a duplex communication with a single command. In this embodiment, the communicators of both Alice and Bob are modified, but the network 100 remains of the conventional type. Specifically, the communicators 130 and 135 are modified, via hardware and/or software, to transmit, receive, process and store data contained in specially coded simplex messages that are transported by the conventional communications network 100. Using the specially coded simplex messages, Bob's communicator 135 can ask Alice's communicator 130 for its duplex communication protocol (e.g., duplex phone number), and Alice's communicator 130 can respond with a specially coded simplex message of its own that contains the requested duplex communication protocol. As the diagram illustrates, the process flows as follows.

At step 205, Alice's communicator 130 creates and sends an ordinary simplex message to the network 100. The simplex message is addressed to Bob's communicator 135. It can take the form of a text, photo or voice message. Thereafter, the network 100 relays the message to Bob's communicator 135.

At step 210, Bob's communicator 135 receives a tactile or voice command from Bob to initiate a duplex communication with Alice. As noted above, Bob may simply say "duplex" or other phrase, or simply press button 185. Either way, Bob's communicator 135 creates a new specially coded simplex message, which will be transparently passed by the network 100 and interpreted by Alice's communicator 130 as a request for Alice's ordinary duplex communication protocol. In some embodiments, the duplex communication protocol is an ordinary duplex telephone number; however, the invention is not so limited to just a duplex number. In other embodiments, the duplex communication protocol is any identifier associated with a particular communications device that allows a duplex communication to be established between the particular communication devices. The term specially-coded simplex message means that the simplex message includes data, in either the message header or body, that distinguishes the message from ordinary text, picture or voice messages.

At step 215, Alice's communicator 130 creates another specially coded simplex message, which will be passed transparently by the network and interpreted by Bob's communicator 135 as a response containing Alice's normal duplex communication protocol. Thereafter, the processor in Bob's communicator 135 processes the message to retrieve Alice's normal duplex communication protocol and automatically initiate a duplex conversation with Alice's communicator 130 without further input from Bob (step 220). This causes Alice's communicator 130 to indicate reception of an incoming duplex call from Bob, which Alice can accept.

Figure 3:
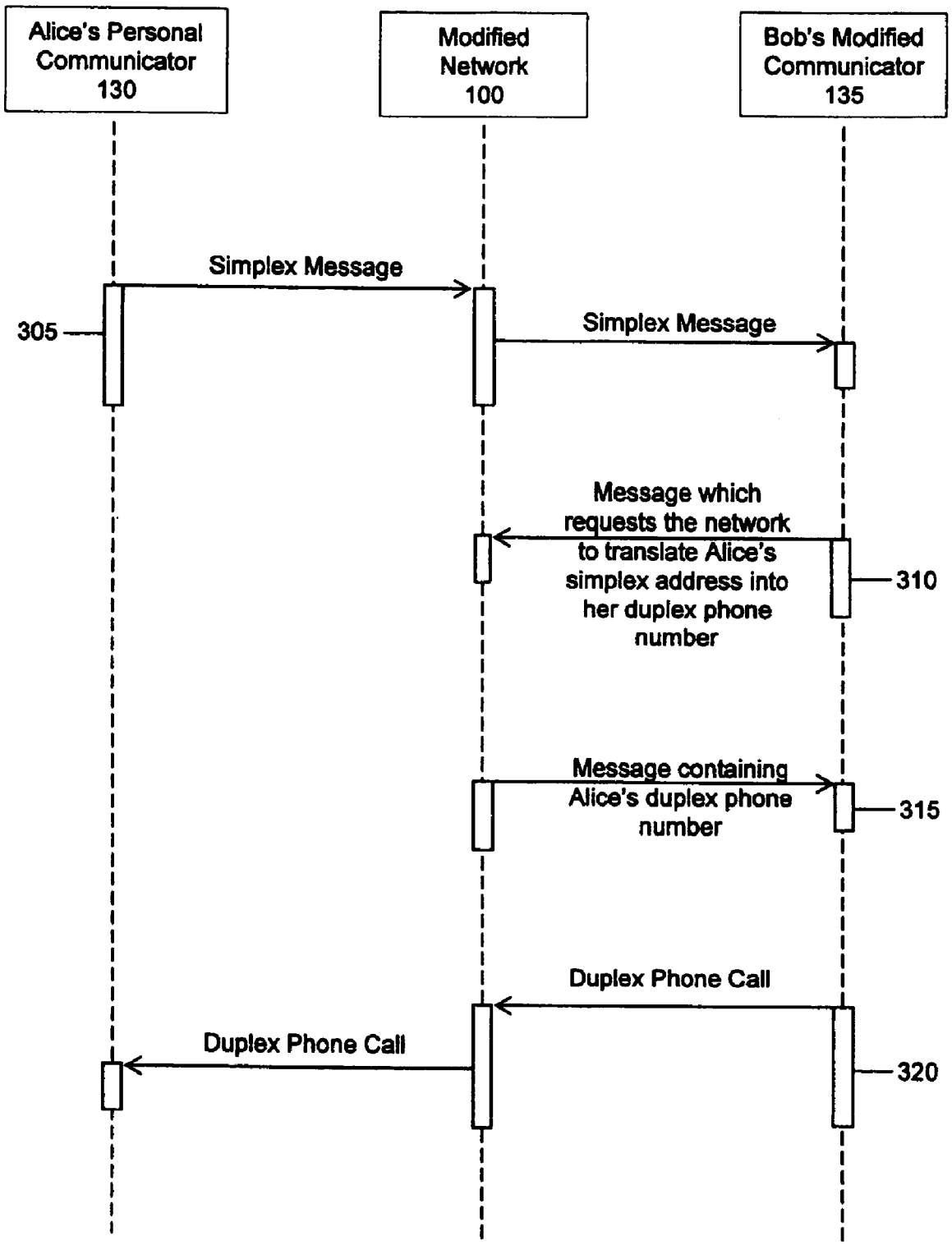
FIG. 3 is a diagram illustrating opening a duplex communication in accordance with the invention.

FIG. 3 is a diagram illustrating a modified duplex call that automatically locates the other party's duplex telephone number and opens a duplex communication. In this embodiment, only Bob's communicator 135 and the network 100 are modified, whereas Alice's communicator 130 is a conventional type of communicator without any modification. At step 305, Alice's communicator 130 sends a normal simplex message via the network 100 to Bob's communicator 135. The message may take the form of a text, picture or audio message. At step 310, Bob's communicator 135 receives a tactile or voice command from Bob to initiate a duplex communication with Alice. In response, Bob's communicator 135 creates and transmits a specially coded simplex message addressed to the network 100. The message includes Alice's (the sender's) simplex ID. Additionally, the specially coded simplex message asks the network 100 to return Alice's duplex communication protocol. The network 100 includes a server-accessible database 110 containing a matched pairs of simplex IDs and duplex communication protocols, as discussed below. Upon receipt of the specially coded simplex message, the network server 105 accesses the relevant database 110 and compares, using a hardware or software implemented comparator, Alice's simplex ID with those listed in the database until a match occurs.

At step 315, the network matches Alice's simplex ID with one listed in the database and retrieves her corresponding duplex communication protocol. Thereafter, the network server 105 creates and transmits another specially coded simplex message back to Bob's communicator 135. The message contains Alice's duplex communication protocol, which enables Bob's communicator 135 to automatically connect to Alice's communicator 130.

At step 320, the processor in Bob's communicator 135 processes the network's message to retrieve Alice's normal duplex communication protocol and automatically initiates a duplex conversation with Alice's communicator 130 without further input from Bob. This causes Alice's communicator 130 to indicate reception of an incoming duplex call from Bob, which Alice can accept merely by pressing a button or speaking.

Figure 4:
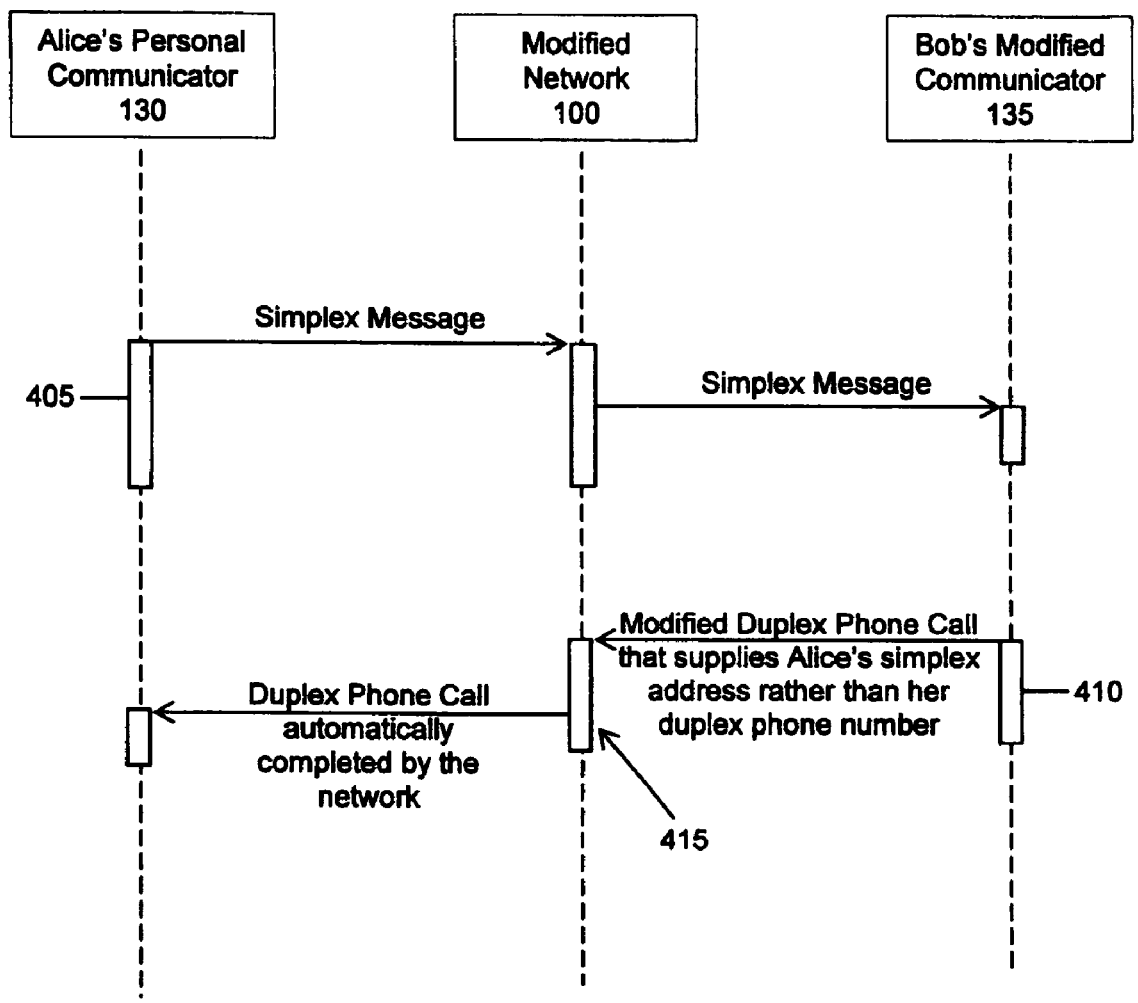
FIG. 4 is a diagram illustrating another embodiment of opening a duplex communication in accordance with the invention.

FIG. 4 is a diagram illustrating a modified duplex message that automatically locates the other party's duplex telephone number and opens a duplex communication. In accordance with the invention, only Bob's communicator 135 and the network 100 are modified in accordance with the invention. At step 405, Alice transmits a normal simplex message to Bob. The message can take the form of a text, picture or video message. At step 410, Bob's communicator receives a tactile or voice command from Bob to establish a duplex communication with Alice. Accordingly, the communicator 135 places a new, modified duplex call, e.g., an ordinary duplex call addressed to the network that contains Alice's simplex ID.

At step 415, the new modified duplex call is intercepted by the network 100, which detects the use of Alice's simplex ID. The network server 105 then compares Alice's simplex ID to matched pairs of simplex IDs and duplex communication protocols that were previously stored in a server-accessible database 110. When a match is found, the network server 105 retrieves Alice's duplex communication protocol and uses it to seamlessly complete Bob's duplex communication. If a match is not located, or if Alice's communicator is unavailable, the network server 105 transmits a message indicating a "no match" or "unfound" signal back to Bob's communicator 135. In this embodiment, Alice's duplex communication protocol is not returned to Bob's communicator 135. Instead, the network server 105 completes the call for Bob.

Figure 5:
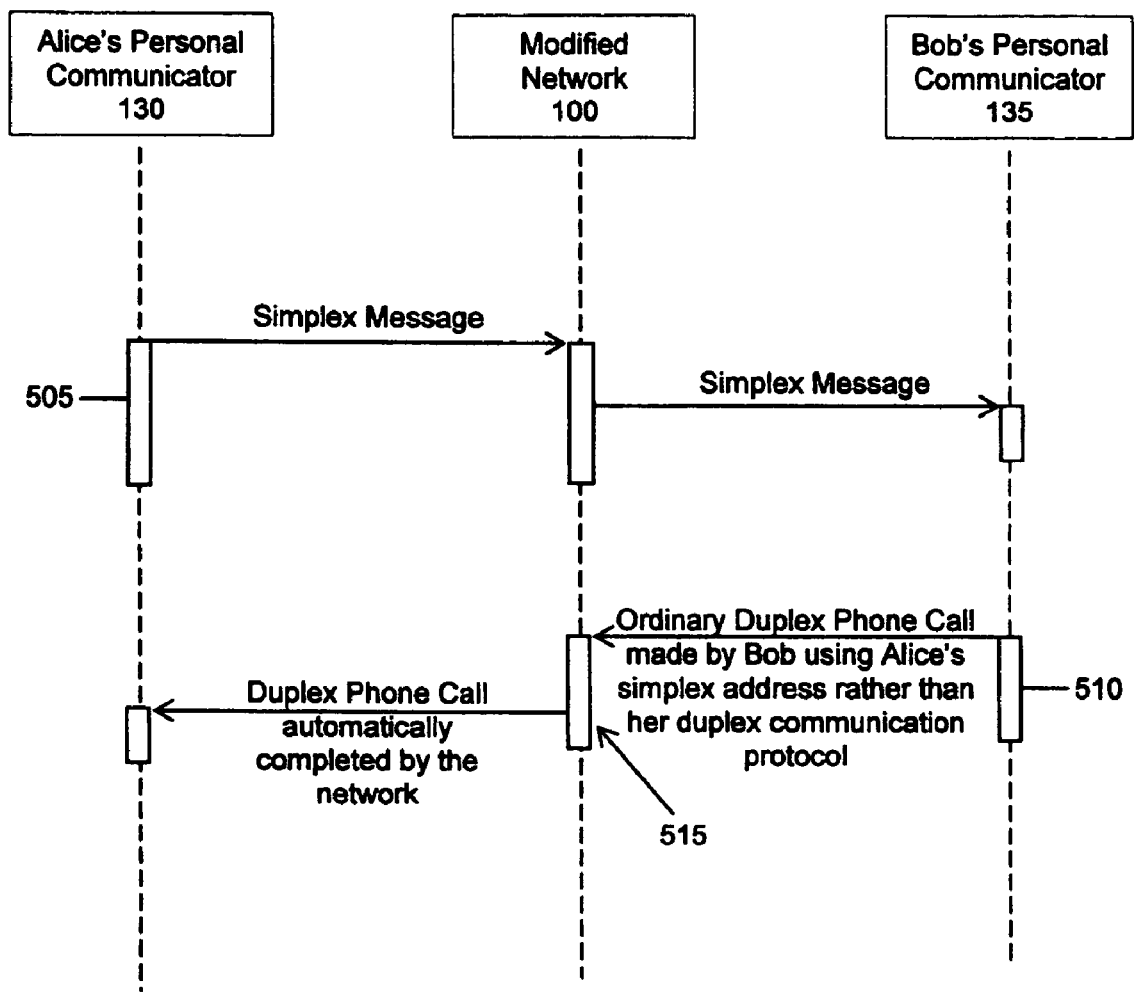
FIG. 5 is a diagram illustrating an embodiment opening a duplex communication in accordance with the invention.

FIG. 5 is a diagram illustrating yet another modified duplex call that automatically locates the other party's duplex telephone number and opens a duplex communication. In this embodiment, only the network 100 is modified in accordance with the invention. At step 505, Alice's communicator 130 sends an ordinary simplex message to Bob's communicator 135 via the network 100. The message may be a text, picture or audio message. At step 510, Bob places a modified duplex call. e.g., an ordinary duplex call that substitutes Alice's simplex ID for her duplex communication protocol.

Ordinarily, such a call would not work; however, at step 515, the modified network server 105 detects the use of Alice's simplex ID and compares it against a plurality of matched pairs of simplex IDs and corresponding duplex communication protocols that were previously stored in a server-accessible database 110. When a match is found, the server 105 retrieves the requested duplex communication protocol and seamlessly connects Bob's communicator 135 to Alice's communicator 130. In this embodiment, Alice's duplex communication protocol does not have to be returned to Bob's communicator 135.

FIG. 6 is a diagram illustrating an illustrative database 600 (similar to database 110) that may be implemented in embodiments of the invention. In one embodiment, the database 600 resides on a telecommunications network server. In another embodiment, the database 600 resides on an individual communicator such as, but not limited to, a personal digital assistant, a cell phone or other digital communications device. The types of database architecture and software that may be used will be readily apparent to one skilled in the art.

In one embodiment, database 600 is implemented in a computer readable software and may include a plurality of data fields arranged to form a table having at least two columns 601 and 605, respectively. A header row that includes adjacent data fields 610 and 615 may be provided. Illustratively, data field 610 contains text data indicating that it represents a title such as, but not limited to, "Simplex IDs." Similarly, data field 615 contains text data indicating that it represents a title such as, but not limited to, "Duplex Phone Numbers" or "Duplex Communication Protocols".

Individual simplex identifiers are stored in corresponding individual data fields 620 . . . 625 . . . 630 in the simplex column 601 under the title data field 610. Similarly, duplex communication protocols are stored in corresponding individual data fields 635 . . . 640 . . . 645 in the duplex column 605 under the title data field 615. In this manner, the duplex communication protocol 635 is uniquely identified with simplex ID 650, and vice versa. When queried by a server that provides a particular simplex ID (not shown) that identically matches a stored simplex ID, the database 600 retrieves and/or returns the corresponding duplex communication protocol associated with the stored simplex ID.

An exception exists where data contained in a duplex data field 640 indicates that the owner of the duplex communication protocol wishes it to remain private. Another exception exists where the duplex communication protocol is not stored in the database 600. In either case, an error message may be returned to a user's web browser or other user interface.

Figure 7:
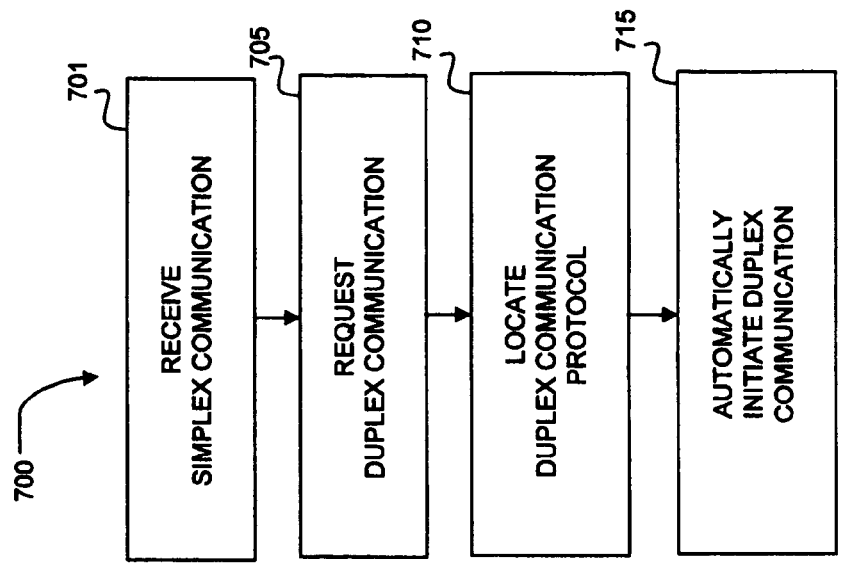
FIG. 7 is a flowchart illustrating one embodiment of a method used by an embodiment of the invention.

FIG. 7 is a flowchart illustrating one embodiment of a method used in various embodiments of the invention. At block 701, a simplex communication is received. Following reception of the simplex communication, a duplex communication is requested, at block 705. At block 710, the sender's duplex communication protocol is then located. And at block 715, a duplex communication is automatically initiated using the sender's located duplex communication protocol.

Figure 8:
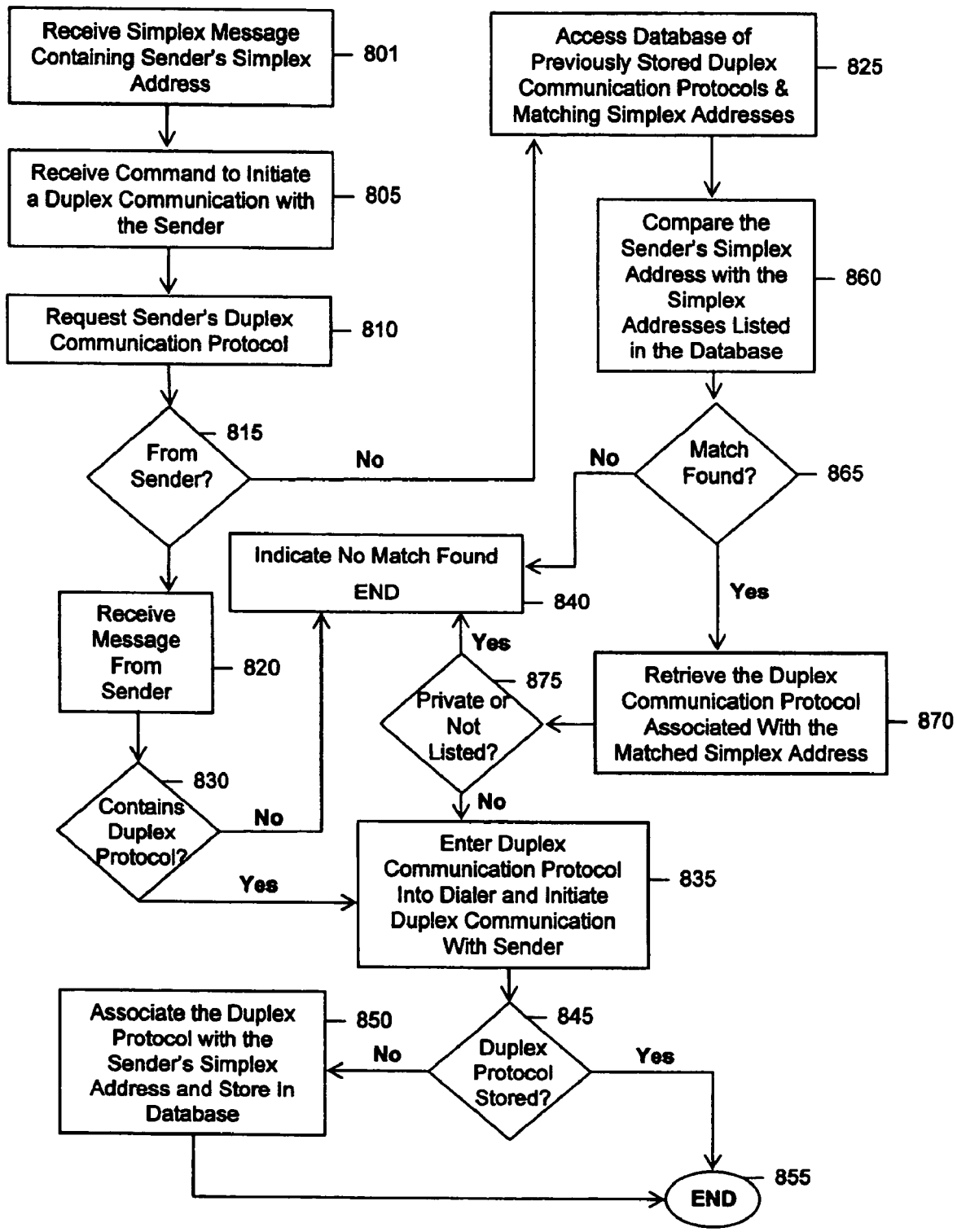
FIG. 8 is a flowchart illustrating another embodiment of a method used by another embodiment of the invention.

FIG. 8 is a flowchart that illustrates another embodiment of a method used to convert a simplex communication into a duplex communication. At block 801, a simplex message that contains its sender's simplex ID is received by a communicator, such as, but not limited to, a cell-phone configured to receive and transmit both simplex and duplex messages. At block 805, software elements of the communicator receive a user-prompted command to initiate a duplex communication with the sender of the simplex message.

At block 810 and decision block 815, a decision is made whether to request the sender's duplex communication protocol either from the sender or from a computer-readable database. If the duplex communication protocol is requested from the sender, the process progresses to block 820; otherwise, to block 825. In one embodiment, the personal communicator which received the sender's simplex message requests the sender's duplex communication protocol by transmitting a specially coded message to the sender's communicator. In another embodiment, the personal communicator which received the sender's simplex message requests the sender's duplex communication protocol by transmitting a coded message to the telecommunications network, which then queries the sender's communicator.

At block 820, a message is received from the sender and its contents analyzed at block 830, if the message contains the sender's duplex communication protocol, the process can then proceed to block 835. If not, the method ends at block 840 by indicating that no match was found. In one embodiment, the message is a specially coded simplex message which contains the sender's duplex communication protocol in its header.

At block 835, the duplex communication protocol is entered into a dialer (either by the recipient's personal communicator or by the telecommunications network server), which may be implemented in either software or hardware, or a combination of both. Once the duplex communication protocol is entered, the dialer initiates a duplex communication with the sender of the original simplex message. Where the network server dials the sender's duplex communication protocol, two connections may be established: (i) a connection with the communicator that received the original simplex message from the sender, and (ii) a connection with the sender's communicator. Once both are established, the network "hands off" by seamlessly joining the two connections together.

At decision block 845, it is determined whether the sender's duplex communication protocol is stored in the communicator's resident database. If not, the process proceeds to block 850. Otherwise, it ends at block 855. At block 850, the duplex communication protocol received from the sender is associated with the sender's simplex ID and stored in the resident database for later retrieval. Thereafter, the process ends at block 855.

Referring again to decision block 815, if the communications protocol is not to be requested from the sender, the method proceeds to block 825. At block 825, a database that has duplex communication protocols and matching simplex IDs stored therein is accessed. In one embodiment, the access may be in the form of a computer-readable request transmitted from a personal communicator to a network server. In another embodiment, the access may be in the form of a computer-readable request routed internally within the circuitry of the personal communicator. Either way, at block 860, a comparator compares the sender's known simplex ID, which was provided in the sender's previously transmitted simplex message, with the plurality of simplex IDs stored within the database.

At decision block 865, it is determined whether a match is found. A match is any simplex ID stored in the database that exactly matches the sender's simplex ID. If a match is found, the method proceeds to block 870. Otherwise, an error message is displayed to the user, and the method ends at block 875.

At block 870, the duplex communication protocol that is uniquely associated with the sender's matched simplex ID is requested from the database. At decision block 875, it is determined whether the requested duplex communication protocol is available or not. For example, as described with respect to FIG. 6, the sender's duplex communication protocol may be unavailable either because it is marked private (e.g., unlisted) or has is not stored in the database. If the duplex communication protocol is available, the process proceeds to blocks 835, 845, 850 and 855 as described above. Otherwise, an error message is indicated and the method ends at block 855.

Additionally, with reference again to FIG. 1, another embodiment of a method for converting a simplex communication to a duplex communication is described as follows. A personal communicator 135 receives a simplex message from a sender's communicator 130. The message includes the sender's simplex ID. Thereafter, a voice or touch command is input into the personal communicator 135. The command requests initiation of a duplex communication with the sender of the simplex message. In response, the processor (not shown) of communicator 135 retrieves computer executable program instructions from a memory "M" associated therewith. The instructions, when executed cause the processor to transmit a coded simplex message to the sender that contains personal communicator 135's duplex communication protocol. Also transmitted in the message is a machine-executable code that, when executed by the sender's processor, causes it to initiate a duplex communication with the personal communicator 135. In other words, the sender's processor automatically loads and dials the duplex communication protocol that was contained in the recipient's reply message.

The invention has been described with reference to several exemplary embodiments. However, modifications may be made without departing from the spirit and scope of the invention as defined by the following claims.

What is claimed is:

1. A method of converting a simplex communication to a duplex communication, the method comprising:
   receiving a simplex message;
   sending the simplex message to a recipient; receiving a coded simplex message, which includes a simplex ID of a sender;
   accessing a database on the network, the database having stored therein at least a plurality of matched pairs of simplex IDs and associated duplex communication protocols;
   comparing the simplex ID of the sender to the plurality of simplex IDs until a match occurs;
   retrieving a duplex communication protocol associated with the matched simplex ID;
   transmitting the duplex communication protocol in response to the simplex message; and
   initiating a duplex communication based on the response.

2. The method of claim 1, wherein the simplex message is received from the recipient of a prior simplex message sent by the sender and the duplex communication protocol is the sender's duplex communication protocol.

3. The method of claim 1, wherein the simplex message is received from the sender and the duplex communication protocol belongs to the recipient of the sender's simplex message.

4. The method of claim 3, wherein transmitting a duplex communication protocol in response to the simplex message further comprises:
   inserting the duplex communication protocol into a header of a packet; and
   inserting machine-executable instructions into a body of the packet that when executed by a processor associated with the sender cause the processor to automatically dial the duplex communication protocol.

5. The method of claim 1, wherein the simplex message is received from a sender and the simplex message contains the simplex ID of the sender.

6. The method of claim 1, wherein the step of transmitting the duplex communication protocol in response to the simplex message is performed by a network server.

7. The method of claim 6, wherein the database is remote from a memory of a communicator used by a recipient of the sender's simplex message.

8. The method of claim 1, wherein the database is stored in a memory of a communicator used by the recipient of the sender's simplex message.

9. A method of converting a simplex communication to a duplex communication, the method comprising:
sending a simplex message to a recipient;
receiving a coded simplex message from a sender that includes a simplex ID;
seeking a duplex communication protocol associated with the simplex ID by accessing a database having stored therein a plurality of matched pairs of simplex IDs and associated duplex communication protocols;
comparing the simplex ID of the sender to the plurality of simplex IDs until a match occurs;
retrieving a duplex communication protocol associated with the matched simplex ID; and
initiating a duplex communication based on the duplex communication protocol associated with the simplex ID.

10. The method of claim 9, wherein the database is remote from a memory of a communicator used by a recipient of the sender's simplex message.

11. The method of claim 10, wherein the step of seeking a duplex communication protocol associated with the simplex ID of the sender and the step of initiating a duplex communication based on the duplex communication protocol are each performed by a network server.

12. The method of claim 10, wherein seeking a duplex communication protocol associated with the simplex ID of the sender is performed by a communicator used by a recipient of the sender's simplex message.

13. The method of claim 12, wherein initiating a duplex communication based on the duplex communication protocol is performed by a communicator used by a recipient of the sender's simplex message.

14. The method of claim 9, wherein the database is stored within a memory of a communicator.

15. The method of claim 10, wherein seeking a duplex communication protocol associated with the sender's simplex ID further comprises transmitting a duplex communication addressed to the sender's simplex ID.

16. The method of claim 15, wherein seeking a duplex communication protocol associated with the simplex ID of the sender further comprises:
comparing the simplex ID of the sender to the plurality of stored simplex IDs until a match occurs;
retrieving the duplex communication protocol associated with the matched simplex ID.

17. The method of claim 16, wherein the step of initiating a duplex communication based on the duplex communication protocol is performed by a network server.

18. The method of claim 16, wherein the step of initiating a duplex communication based on the duplex communication protocol is performed by a communicator used by a recipient of the simplex message.

19. A computer program product comprising a computer usable medium having computer-readable program code embodied in the medium, the computer program product includes at least one component to:
send a simplex message to a recipient;
receive a coded simplex message from a sender that includes the sender's simplex ID;
seek a duplex communication protocol of the sender by querying a database having stored therein a plurality of matched pairs of simplex IDs and associated duplex communication protocols;
compare the simplex ID of the sender with the plurality of stored simplex IDs until a match occurs;
retrieve the duplex communication protocol associated with the matched simplex ID; and
initiate a duplex communication based on the match.

20. A communicator for converting a simplex communication into a duplex communication, the communicator comprising:
a simplex transceiver and a duplex transceiver both coupled to a central processing unit (CPU);
a memory for storing computer-readable instructions, the computer-readable instructions to cause a processor to:
receive a simplex message;
send the simplex message to a recipient;
receive a coded simplex message, which includes a simplex ID of a sender;
access a database on the network, the database having stored therein at least a plurality of matched pairs of simplex IDs and associated duplex communication protocols;
compare the simplex ID of the sender to the plurality of simplex IDs until a match occurs;
retrieve a duplex communication protocol associated with the matched simplex ID;
transmit the duplex communication protocol in response to the simplex message; and
initiate a duplex communication based on the response.

21. The comparator of claim 20, further comprising a comparator to compare the simplex ID received in the simplex message with contents of the database.

22. The comparator of claim 20, wherein the communicator is one of a cell phone, a handheld personal computer, or a personal digital assistant.

23. The communicator of claim 22, further comprising a coding module to uniquely code the coded simplex message transmitted from the communicator as a request for the duplex communication protocol, wherein the duplex communication protocol is uniquely associated with another communicator.

24. The communicator of claim 20, further comprising a command interface to receive a command from a user of the communicator to initiate the duplex communication with the sender of the simplex message.

* * * * *

UNITED STATES PATENT AND TRADEMARK OFFICE
CERTIFICATE OF CORRECTION

PATENT NO. : 7,630,330 B2  Page 1 of 1
APPLICATION NO. : 10/926495
DATED : December 8, 2009
INVENTOR(S) : Todd D. Gatts It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1464 days.

Signed and Sealed this

Second Day of November, 2010

David J. Kappos
*Director of the United States Patent and Trademark Office*